(12) United States Patent
Saen et al.

(10) Patent No.: US 7,337,251 B2
(45) Date of Patent: Feb. 26, 2008

(54) INFORMATION PROCESSING DEVICE WITH PRIORITY-BASED BUS ARBITRATION

(75) Inventors: Makoto Saen, Kokubunji (JP); Hiroshi Ueda, Kodaira (JP); Eiji Yamamoto, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 102 days.

(21) Appl. No.: 11/304,567

(22) Filed: Dec. 16, 2005

(65) Prior Publication Data

US 2006/0149884 A1 Jul. 6, 2006

(30) Foreign Application Priority Data

Dec. 17, 2004 (JP) ............................. 2004-365489

(51) Int. Cl.
*G06F 13/18* (2006.01)
(52) U.S. Cl. ...................... 710/116; 710/120; 710/123; 710/243
(58) Field of Classification Search ................ 710/116, 710/120, 123, 243
See application file for complete search history.

(56) References Cited

U.S. PATENT DOCUMENTS

| | | | | |
|---|---|---|---|---|
| 5,151,994 A | * | 9/1992 | Wille et al. ................. | 710/116 |
| 5,862,355 A | * | 1/1999 | Logsdon ...................... | 710/116 |
| 5,884,051 A | * | 3/1999 | Schaffer et al. ............. | 710/107 |
| 6,411,218 B1 | * | 6/2002 | Johnson ...................... | 710/107 |
| 6,467,002 B1 | * | 10/2002 | Yang .......................... | 710/116 |
| 6,704,821 B2 | * | 3/2004 | Scandurra et al. .......... | 710/243 |
| 7,073,003 B2 | * | 7/2006 | Chae .......................... | 710/111 |
| 7,130,943 B2 | * | 10/2006 | Moyer et al. ............... | 710/107 |
| 2002/0133654 A1 | * | 9/2002 | Yamamoto .................. | 710/116 |
| 2003/0167294 A1 | * | 9/2003 | Neuman ..................... | 709/102 |

\* cited by examiner

*Primary Examiner*—Glenn A. Auve
(74) *Attorney, Agent, or Firm*—Miles & Stockbridge P.C.

(57) ABSTRACT

The information processing device comprises first and second master circuits and an arbiter for arbitrating access rights to a bus to which the master circuits are connected. The arbiter has storage units retaining information representing priorities of the access rights, and an arbitration control logical unit for arbitrating the access rights of the master circuits based on the information. When the priority of the first master circuit is higher than the priority of the second master circuit and there is no access request from the first master circuit but there is an access request from the second master circuit, the arbitration control logical unit permits access of the second master circuit, and the storage units lower the priority of the second master circuit without changing the priority of the first master circuit.

6 Claims, 11 Drawing Sheets

INFORMATION PROCESSING DEVICE WITH PRIORITY-BASED BUS ARBITRATION

CROSS-REFERENCE TO RELATED APPLICATION

The present application claims priority from Japanese Patent Application No. JP 2004-365489 filed on Dec. 17, 2004, the content of which is hereby incorporated by reference into this application.

TECHNICAL FIELD OF THE INVENTION

The present invention relates to an information processing device. More particularly, it relates to a technology effectively applied to the configuration of a system LSI which includes circuit modules such as a CPU, an accelerator for particular process, and various memory controllers and performs a large amount of data transfer among the circuits.

BACKGROUND OF THE INVENTION

For example, as the technologies in the field of a system LSI for performing a large amount of data transfer among a plurality of circuit modules, the inventors of the present invention have examined the following technologies.

In a SOC (System On a Chip) in which a number of circuit modules are incorporated, the circuit modules which have not had strong connection with each other are directly connected to one another by an on-chip bus in the LSI. In such a LSI, the control of resource conflict among a plurality of circuit modules is an important factor for determining the system performance.

Hereinafter, the circuit module which outputs a resource use request to other circuit module will be referred to as "master", and the resource which is to be used on the other hand will be referred to as a "target resource".

In recent years, the problem of the resource conflict has drawn attention. Particularly, in the field of built-in microcomputers, the demand for performing a large amount of real-time data processing, for example, the high-resolution video processing has been increasing. In such real-time applications, a control method for compensating the amount of target resource usage for each of the tasks executed on a master is required. In actual use, it is important to have tolerance against variation in the timing of target resource use requests for each task and to have flexibility which enables optimization according to the usage of the user.

The variation in timing mentioned here means that the timing of target resource requests outputted from the masters is not constant. If the target resource use requests are always being outputted or always have a limited pattern, it is easy to compensate the target resource usage amounts for the masters. However, in practice, the requests are affected by the types of the applications, access timing from outside the LSI and the like and are changed in a complicated manner. Even when such changes occur, the target resource usage amounts for the masters have to be compensated.

The method used most commonly is a round-robin method which is also used in Japanese Patent Application Laid-Open Publication No. 2002-269032. This is a method in which the right to use a target resource is given to conflicting masters in a predetermined order. This is a simple method and has a merit in terms of circuit implementation since the circuit scale is small. However, since the order of using the target resource is fixedly allocated, if a master cannot issue a target resource use request at the timing when the usage order of the master is allocated, the master cannot use a planned amount of the target resource, which affects the performance. As described above, the target resource usage amount cannot be compensated for each of the masters in some cases when the process request timing of the master is varied.

Also, as a method frequently used in a real-time compensation system, a method in which the right to occupy a target resource is fixedly given in a time-sharing manner is known. In this method, the target resource usage amounts can be precisely compensated for connected masters. However, when the master cannot output a request in the cycle in which it is prioritized due to the above-described variation, the target resource is not effectively utilized, and a wasted cycle is caused.

A method for effectively utilizing the wasted cycle is the method disclosed in Japanese Patent Application Laid-Open Publication No. 2004-5677. In this method, when there is no request from the most prioritized master, a request from another master is accepted so as to effectively utilize the target resource. However, even in this method, when the above-described variation occurs, the target resource usage amount for each of the tasks cannot be compensated in some cases.

In addition, in relation to the point of flexibility, for example, as disclosed in Japanese Patent Application Laid-Open Publication No. 9-185580, a method in which the flexibility is realized by providing a rewritable storage device in the interior is known.

SUMMARY OF THE INVENTION

The present invention is accomplished for eliminating the above-described defects of the conventional technologies, and an object of the present invention is to optimize the target resource conflict among a plurality of masters so as to fully exert the system performance with limited target resources. In particular, for applying to the real-time applications, the target resource usage rate for each process has to be compensated.

In actual use, it is necessary to satisfy the following conditions, that is, (1) optimization according to the usage manner of the user can be performed, (2) tolerance against variation in the timing of target resource usage requests of each task is provided, and (3) operating frequencies, the circuit scale and the like are not largely affected.

The above and other objects and novel characteristics of the present invention will be apparent from the description of this specification and the accompanying drawings.

The typical ones of the inventions disclosed in this application will be briefly described as follows.

That is, an information processing device according to the present invention comprises: first and second bus master circuits; a bus to which the first and second bus master circuits are connected; and a first arbiter for arbitrating access rights of the first and second bus master circuits to the bus, wherein the first arbiter has a storage unit for retaining information representing priorities of the access rights of the first and second bus master circuits and a control unit for arbitrating the access rights of the first and second bus master circuits based on the information of the storage unit, and, when the priority of the first bus master circuit is higher than the priority of the second bus master circuit and there is no access request from the first bus master circuit but there is an access request from the second bus master circuit, the control unit permits access of the second bus master circuit and the storage unit lowers the priority of the second bus master circuit without changing the priority of the first bus master circuit.

Also, an information processing device according to the present invention comprises: first and second bus master circuits; a bus to which the first and second bus master circuits are connected; and a first arbiter for arbitrating access rights of the first and second bus master circuits to the bus, wherein the first arbiter has a storage unit for retaining information representing priorities of the access rights of the first and second bus master circuits and a control unit for arbitrating the access rights of the first and second bus master circuits based on the information of the storage unit, the storage unit has flags retaining information representing whether access of the first or second bus master circuit is permitted or not, when the priority of the first bus master circuit is higher than the priority of the second bus master circuit and there is no access request from the first bus master circuit but there is an access request from the second bus master circuit, the control unit permits access of the second bus master circuit and the storage unit stores, in the flag, information representing that access is permitted, and, when access of the first bus master circuit is permitted, the priorities of the first bus master circuit and the second bus master circuit are lowered, According to the information processing device according to the present invention, efficiency of target resource usage can be improved.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment of Information Processing Device

Figure 1:
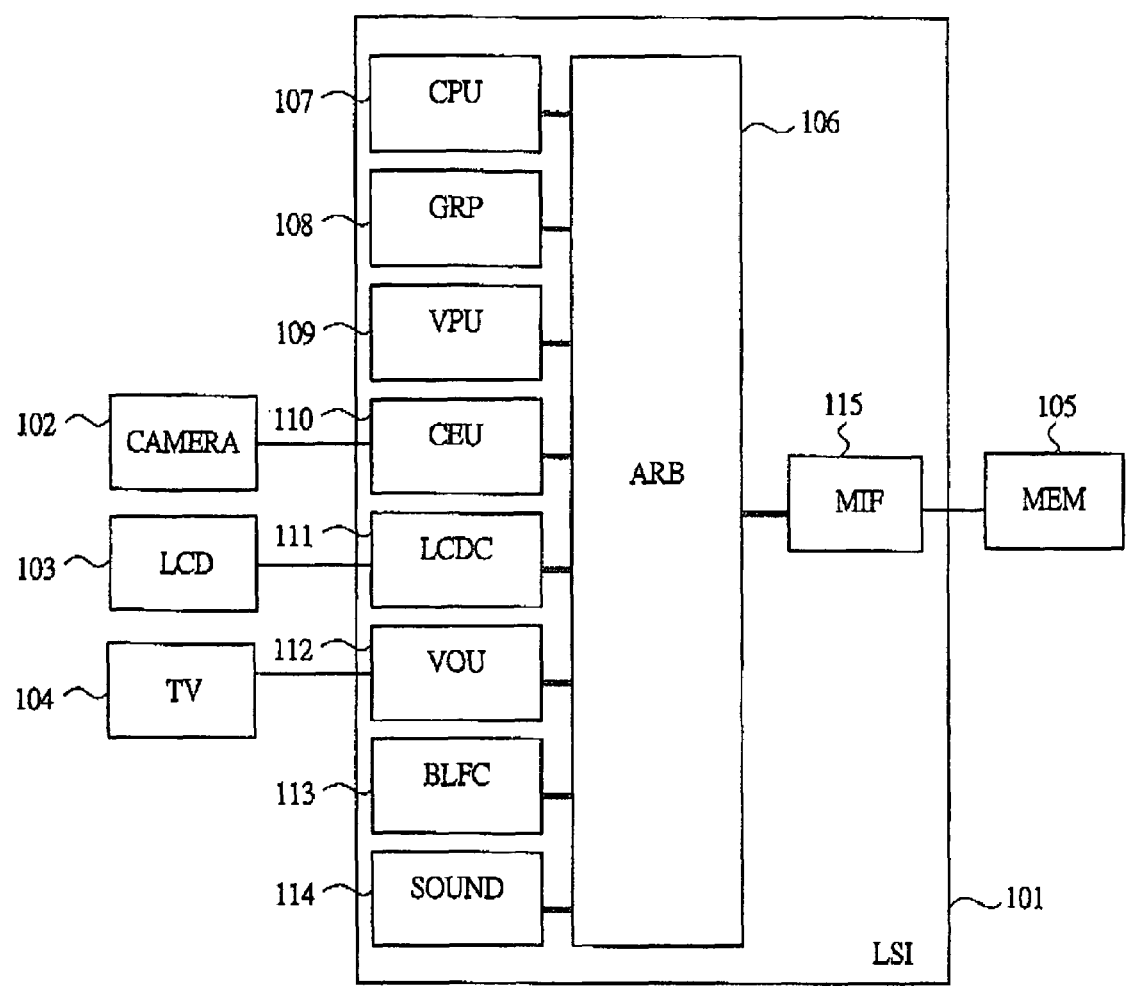
FIG. 1 is a block diagram showing the configuration of a first embodiment of an information processing device according to the present invention.

FIG. 1 is a block diagram showing the configuration of a first embodiment of an information processing device according to the present invention.

First, an example of the configuration of the information processing device according to this embodiment will be described with reference to FIG. 1. The information processing device of this embodiment is, for example, an information processing device for a mobile phone and is comprised of a semiconductor integrated circuit (LSI) 101, a camera (CAMERA) 102, a liquid crystal display (LCD) 103, a television (TV) 104, a memory (MEM) 105, and others. Also, LSI 101 is comprised of a target resource use request arbiter (ARB) 106, a CPU 107, a graphics accelerator (GRP) 108, an image compression/decompression accelerator (VPU) 109, a camera interface (CEU) 110, an LCD control circuit (LCDC) 111, a video interface (VOU) 112, a circuit module (BLFC) 113 for performing blending and format conversion of images, a circuit module (SOUND) 114 for performing sound processing, a memory interface (MIF) 115 for controlling MEM 105, and others.

Furthermore, CPU 107, GRP 108, VPU 109, BLFC 113, SOUND 114, and MIF 115 are connected to ARB 106, and CAMERA 102, LCD 103, and TV 104 are connected to ARB 106 via CEU 110, LCDC 111, and VOU 112, respectively.

In the configuration of the information processing device of this embodiment, one memory (MEM) 105 (corresponding to a target resource) is shared via the target resource use request arbiter (ARB) 106 (corresponding to a first arbiter) for arbitrating requests from a plurality of circuit modules (corresponding to bus master circuits) such as CPU 107, GRP 108, VPU 109, CEU 110, LCDC 111, VOU 112, BLFC 113, and SOUND 114. This configuration example has an advantage that, since the distance between the plurality of circuit modules and the memory is short, latency is short and the design is simple.

Although not shown in FIG. 1, the information processing device of this embodiment is provided with a bus, and the plurality of circuit modules (bus master circuits) are connected to the bus. This is true of the following examples.

Second Embodiment of Information Processing Device

Figure 2:
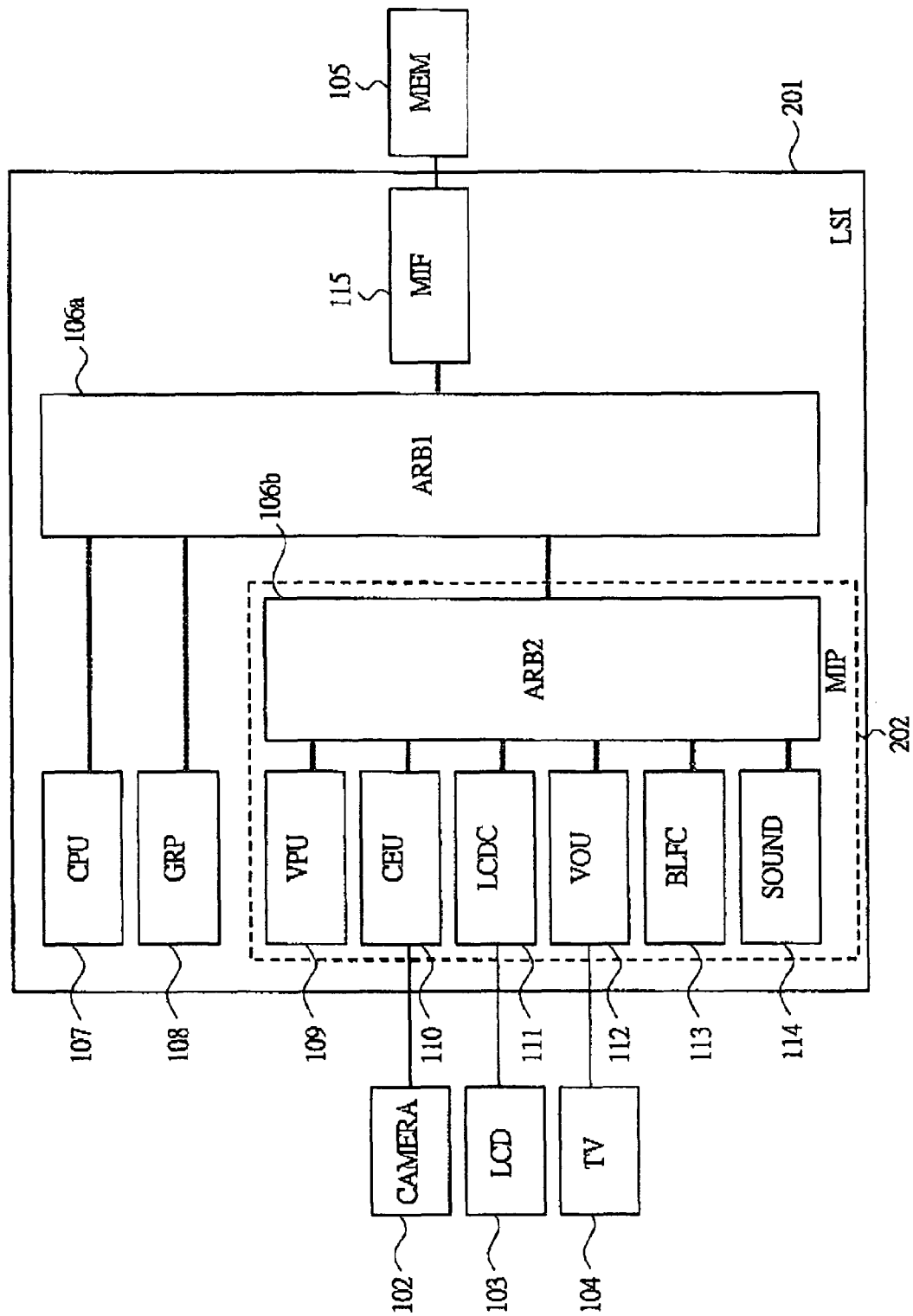
FIG. 2 is a block diagram showing the configuration of a second embodiment of the information processing device according to the present invention.

FIG. 2 is a block diagram showing the configuration of a second embodiment of the information processing device according to the present invention.

In the information processing device shown in FIG. 2, the connection is formed in a hierarchical structure, in which functions equivalent to those of FIG. 1 are realized. More specifically, a plurality of circuit modules such as VPU 109, CEU 110, LCDC 111, VOU 112, BLFC 113, and SOUND 114 and a target resource use request arbiter (ARB2) 106b (corresponding to a second arbiter) are assembled as one circuit module (MIP) 202 (corresponding to a second bus master circuit), and the target resource use request arbiter (ARB2) 106b arbitrates access requests of the plurality of circuit modules (VPU109, CEU110, LCDC 111, VOU 112, BLFC 113, and SOUND 114) to a target resource use request arbiter (ARB1) 106a (corresponding to first arbiter). Hereinafter, the target resource use request arbiter will be also referred to as "arbiter".

Such a hierarchical structure has advantages that the arbiters ARB1 and ARB2 can be operated at high frequencies, and simplicity in product deployment can be improved by virtue of assembling highly relevant circuit modules into one IP (MIP).

Third Embodiment of Information Processing Device

Figure 3:
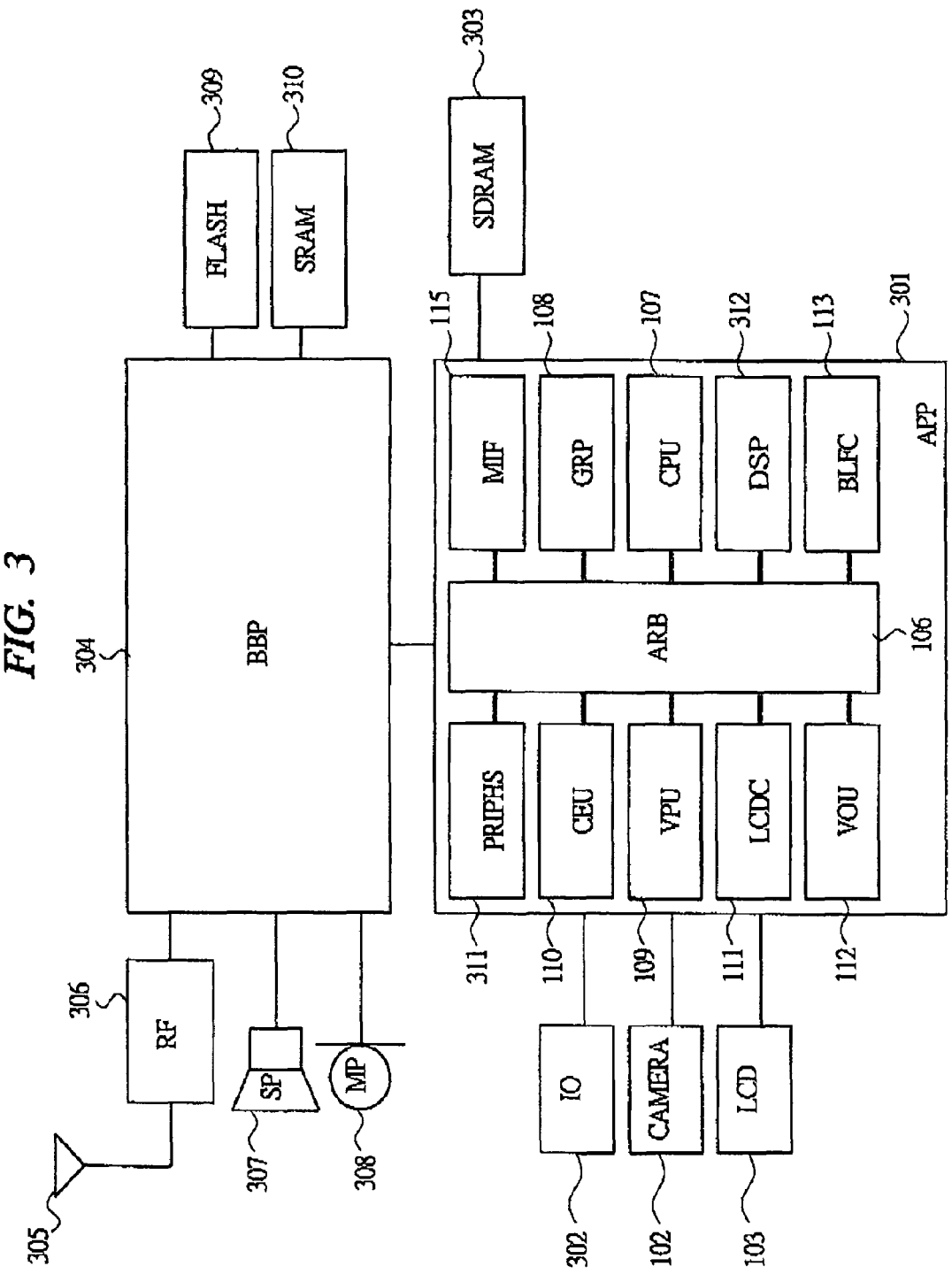
FIG. 3 is a block diagram showing the configuration of a third embodiment of the information processing device according to the present invention.

FIG. 3 is a block diagram showing the configuration of a third embodiment of the information processing device according to the present invention.

The information processing device shown in FIG. 3 is an example of a system configuration including above-mentioned ARB 106. The information processing device shown in FIG. 3 is, for example, an information processing device for a one-chip mobile phone and is comprised of an antenna 305, RF (Radio Frequency) 306, a baseband processor (BBP) 304, an application processor (APP) 301 for performing multimedia processing, a speaker (SP) 307, a microphone (MP) 308, various interfaces (IO) 302, a camera (CAMERA) 102, LCD 103, various memories (FLASH 309, SRAM 310, SDRAM 303), and others. Each of RF 306, SP 307, MP 308, FLASH 309, SRAM 310, and APP 301 is connected to BBP 304, the antenna 305 is connected to RF 306, and each of IO 302, CAMERA 102, LCD 103, and SDRAM 303 is connected to APP 301, Also, the application processor (APP) 301 includes the arbiter (ARB) 106, the image compression/decompression accelerator (VPU) 109, the circuit module (BLFC) 113 for performing blending and format conversion of images, the camera interface (CEU) 110, the LCD control circuit (LCDC) 111, the video interface (VOU) 112, the memory interface (MIF) 115, the CPU 107, DSP 312, the graphics accelerator (GRP) 108, and a various peripheral circuit module (PRIPHS) 311, and the ARB 106 performs access arbitration therebetween.

First Embodiment of Target Resource Use Request Arbiter

Figure 4:
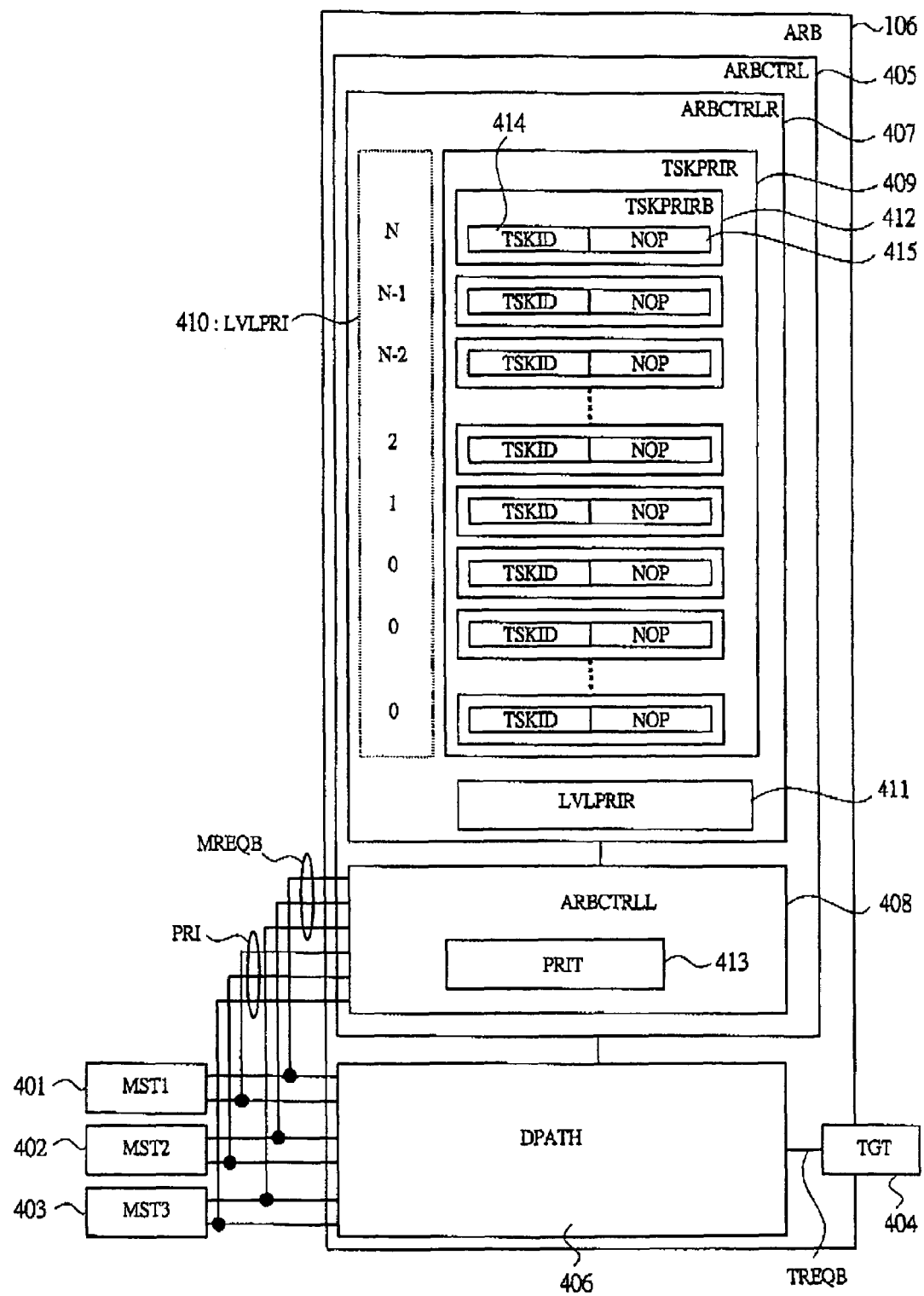
FIG. 4 is a block diagram showing the configuration of a first embodiment of a target resource use request arbiter (ARB) in the information processing device according to the present invention.

FIG. 4 is a block diagram showing the configuration of a first embodiment of a target resource use request arbiter in the information processing device according to the present invention. In FIG. 4, the target resource use request arbiter (ARB) 106 corresponds to ARB 106, 106a, 106b in the first to third embodiments of the information processing device, master circuits (MST1 to MST3) 401, 402, and 403 correspond to the plurality of circuit modules (bus master circuits) such as CPU 107, GRP 108, VPV 109, CEU 110, LCDC 111, VOU 112, BLFC 113, and SOUND 114 in the first to third embodiments of the information processing device, and a target resource (TGT) 404 corresponds to a memory such as MIF 115, MEM 105, or SDRAM 303 in the first to third embodiments of the information processing device. Each of the master circuits (MST1 to MST3) 401, 402, and 403 is connected to ARB 106 by signal lines of PRI and MREQB, and TGT 404 is connected thereto by a signal line of TREQB. ARB 106 receives target resource use requests via target resource use request origin signal group MREQB from the plurality of master circuits (MST1 to MST3) 401, 402, and 403, and after arbitration, it transmits a selected request to the target resource (TGT) 404 via target resource use request signal group TREQB.

The configuration of the target resource use request arbiter (ARB) 106 in this embodiment will be described with reference to FIG. 4. The target resource use request arbiter (ARB) 106 in this embodiment has an arbitration control unit (ARBCTRL) 405 for arbitrating a plurality of requests and a data path unit (DPATH) 406 which transmits the information from a selected master to the target resource (TGT) 404 in response to a result from ARBCTRL 405. The arbitration control unit (ARBCTRL) 405 has a first storage unit (ARBCTRLR) 407 for programming the target resource use patterns of each task and an arbitration control logical unit (ARBCTRLL) 408 which determines the task to which a right to use is to be given in accordance with values programmed in the first storage unit (ARBCTRLR) 407 and target resource use history.

Furthermore, a register group (TSKPRIR) 409 for programming the target resource use patterns included in the first storage unit (ARBCTRLR) 407 is comprised of an assembly of unit storage blocks (TSKPRIRB) 412 including storage units for specifying task IDs (TSKID) 414 and storage units for specifying numbers of permitted target resource use requests (NOP) 415.

Furthermore, LVLPRI 410 included in the first storage unit (ARBCTRLR) 407 shows initial values of the priorities of the unit storage blocks (TSKPRIRB) 412. In FIG. 4, the higher the level in TSKPRIR 409 is, the higher the priority is, and a storage unit for specifying the upper limit thereof is LVLPRIR 411. In FIG. 4, an integer N is set in LVLPRIR 411. When the value specified in LVLPRIR 411 is smaller than the number of blocks M, the priorities of M-N th and lower blocks TSKPRIRB 412 are 0.

A second storage unit (PRIT) 413 is a storage unit in which the initial information of the first storage unit (ARBCTRLR) 407 is inputted and the internal information is changed in accordance with the operation of the information processing device of this embodiment, and similar to the TSKPRIR 409, it is comprised of a register group and others. In the configuration of FIG. 4, PRIT 413 is included in ARBCTRLL 408. However, the configuration is not limited to this, and it may be provided outside ARBCTRLL 408.

Figure 5:
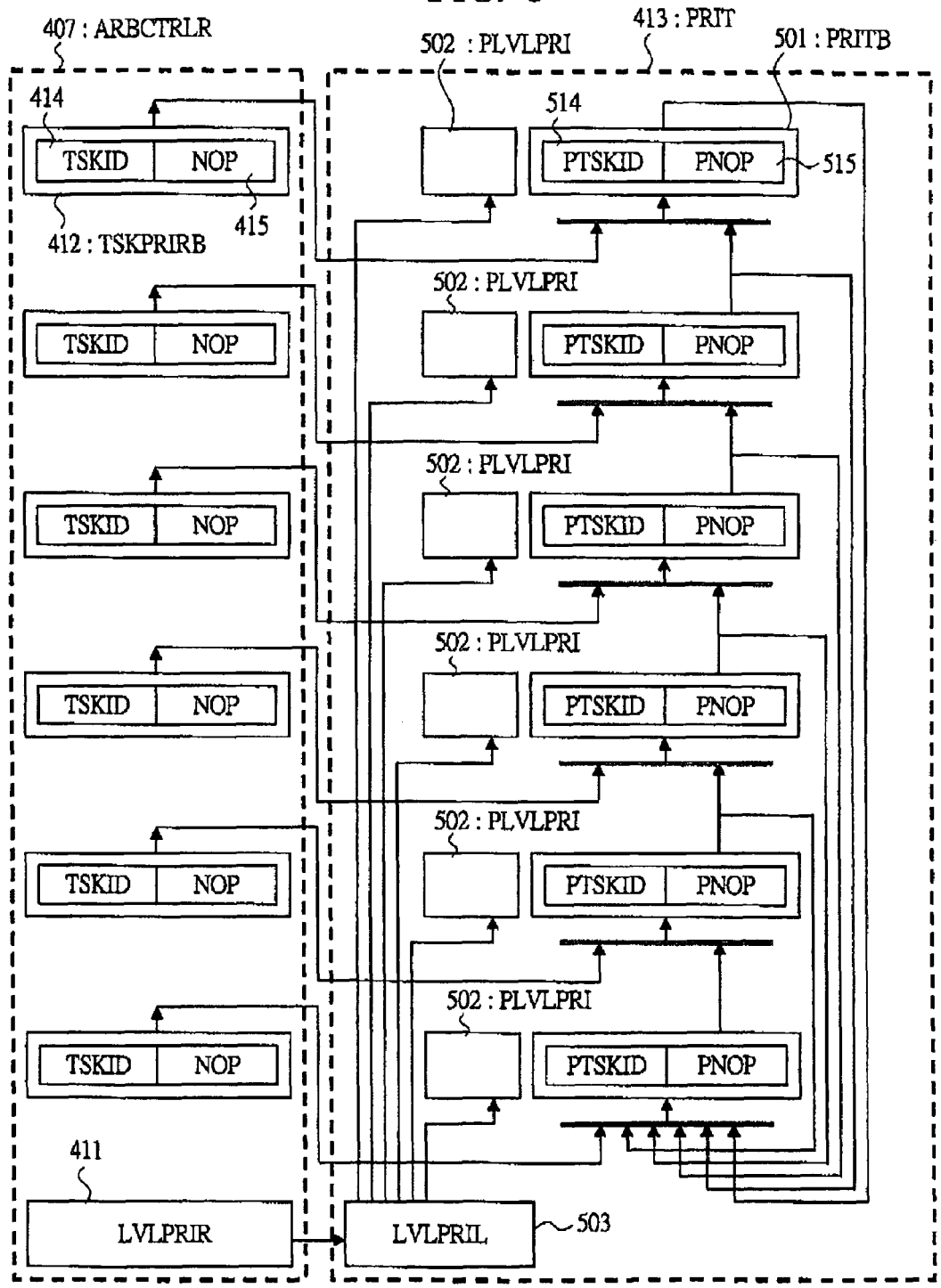
FIG. 5 is a diagram showing a configuration example of a first storage unit (ARBCTRLR) and a second storage unit (PRIT) in the target resource use request arbiter (ARB) shown in FIG. 4.

FIG. 5 is a diagram showing an embodiment of the second storage unit (PRIT) 413 and the relation thereof with the first storage unit (ARBCTRLR) 407. This example shows a case where six levels of priority specifications are provided. PRIT 413 is a block including PRITB 501 including PTSKID 514 representing a task ID and the number of permitted target resource use requests PNOP 515, PLVLPRI 502 representing the priorities corresponding thereto, and LVLPRIL 503 for generating PLVLPRI 502 from LVLPRIR 411 in the first storage unit (ARBCTRLR) 407. Each PRITB 501 is connected to corresponding TSKPRIRB 412 (TSKID 414, NOP 415) in the first storage unit (ARBCTRLR) 407 and other FRIRB 501, and the value of TSKPRIRB 412 is set when PRIT 413 is to be initialized and a value of another PRITB 501 is set when this FRIT 413 is to be updated. In this example, the higher the level is, the higher the priority is, and the lowest level represents the task having the lowest priority in this table. Therefore, the PRITB 501 (FTSKID 514, PNOP 515) in the lowest level is connected to more PRITBs 501 (FTSKIDs 514, PNOPs 515).

Figure 6:
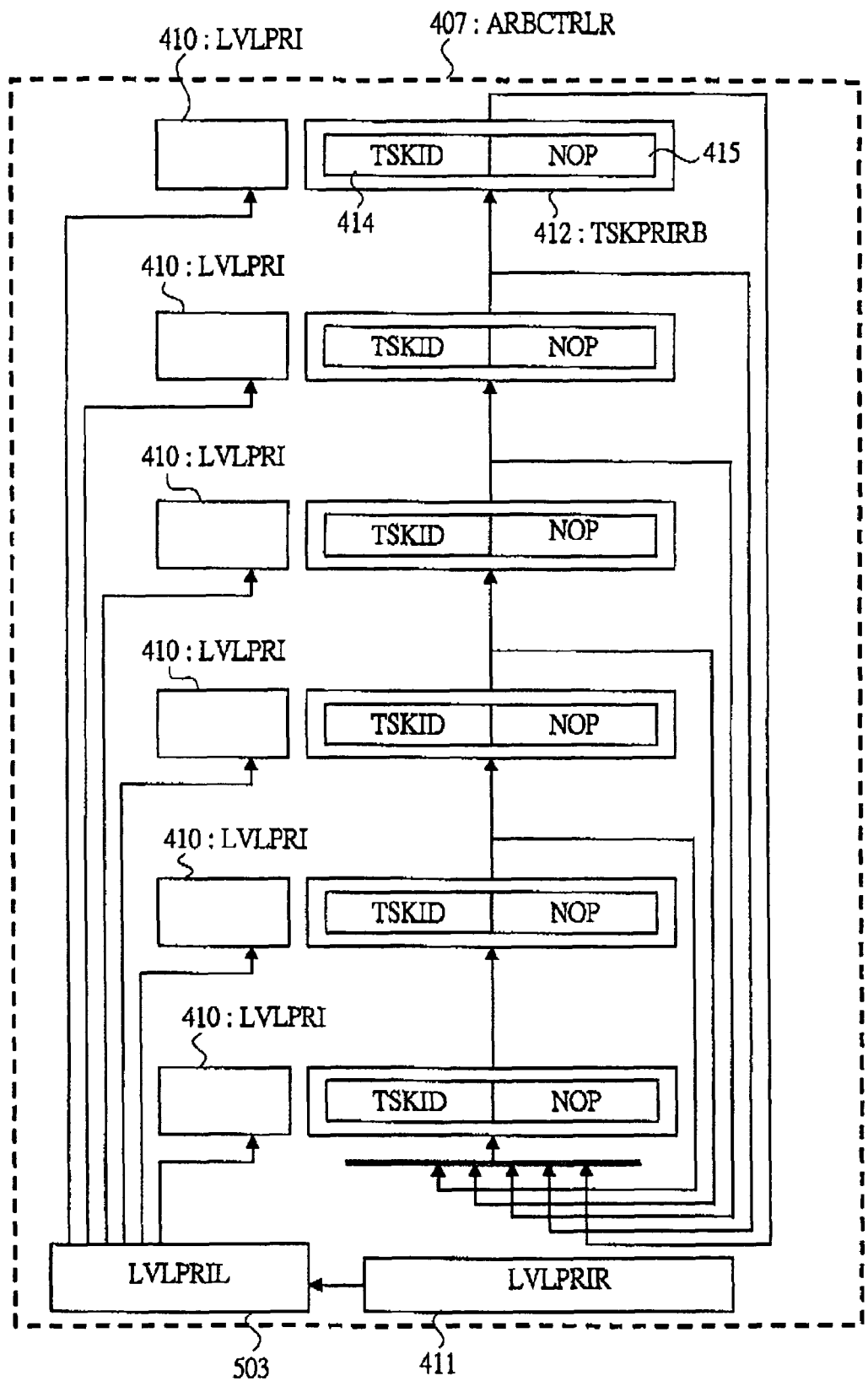
FIG. 6 is a diagram showing another configuration example of the first storage unit (ARBCTRLR) and the second storage unit (PRIT) in the target resource use request arbiter (ARB) shown in FIG. 4.

The method of FIG. 5 employs a configuration in which PRIT 413 is provided other than ARBCTRLR 407 and set values are always retained. In this method, since the initial values of the priority table are retained and initialization can be performed by means of hardware, the method has an advantage that load is not imposed on software. However, this method also has a problem that the circuit scale is increased. Therefore, a method in which a table in ARBCTRLR 407 is used for priority management without separately providing PRIT 413 (FIG. 6) is also available. In the method of FIG. 6, when initialization of the table is required, re-initialization is performed to a storage device by software.

Figure 7:
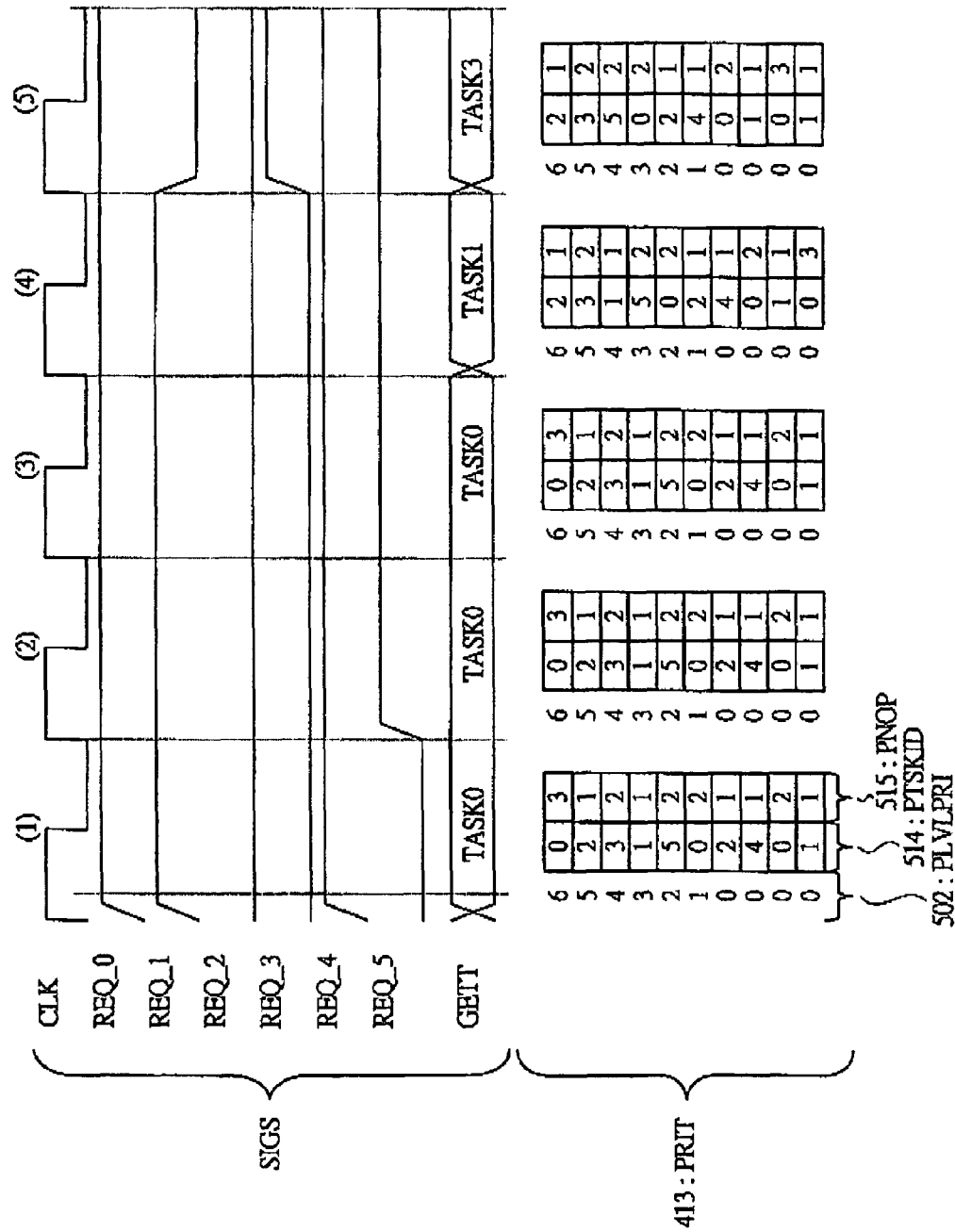
FIG. 7 is a diagram showing an operation of a first embodiment of the target resource use request arbiter (ARB) in the information processing device according to the present invention.

Next, a basic operation of the target resource use request arbiter (ARB) 106 will be described with reference to FIG. 7. FIG. 7 is a diagram showing a basic operation of the target resource use request arbiter (ARB) 106 in the first embodiment.

FIG. 7 shows a case where tasks 0 to 5 share one target resource. In FIG. 7, the upper part SIGS represents signal operations in respective cycles, in which CLK is clocks, REQ_0 is a resource use request from the task 0, REQ_1 is a resource use request from the task 1, REQ_2 is a resource use request from the task 2, REQ_3 is a resource use request from the task 3, REQ_4 is a resource use request from the task 4, REQ_5 is a resource use request from the task 5, and GETT is the tasks which have obtained the right to use the target resource in respective clock cycles.

The lower part of FIG. 7 represents the transition in each of the priority tables (PRIT 413), which is locally provided in the arbitration control logical unit (ARBCTRLL) 408, in respective clock cycles. In each table, a first column (PLVLPRI 502) shows the priorities of corresponding rows, a second column (PTSKID 514) shows task IDs, and a third column (PNOP 515) shows the number of permitted target resource use requests. The initial values of the table are the values programmed in above-described ARBCTRLR 407.

In the clock cycle (1), requests from the tasks 0, 1, and 4 conflict, and the task 0 having the highest priority among them obtains the right to use the target resource. This is true of the clock cycles (2) and (3). At the time when the clock cycle (3) is completed, the task 0 has completed specified three processes. Therefore, the priority of the row (block) drops to the lowest level, and the priorities of the tasks that are specified in the rest of the rows are raised. Then, the priority of the task 2 becomes the highest. In the clock cycle (4), requests of the tasks 0, 1, 4, and 5 conflict, and the task 1 having the highest priority among them obtains the right to use the target resource. At the time when the clock cycle (4) is completed, the priority of the task 1 drops to the lowest level since a number of processes thereof specified in the third row of the table are completed, and the fourth and the following rows are sequentially raised. At this time, the priorities of the tasks 2 and 3 are maintained without change. Accordingly, even when the timing of the target resource use requests from the masters are varied, the lower limit of the usage amount of the target resource can be maintained for each of the tasks.

Furthermore, there are a plurality of options for the timing to initialize the interior priority table (initial values are the values of TSKPRIR 409). A first one is the method in which initialization is performed only at the point of initialization of the circuit. In this method, an optimum priority table may be formed in a self-coordinating manner.

A second one is the method in which the table is explicitly cleared by a program. In order to employ this method, for example, initialization by means of a command dedicated to table initialization and access to a dedicated address has to be implemented.

A third one is the method in which the table is automatically initialized at predetermined cycles. In order to employ this method, a storage device which can program the table initialization cycles is mounted.

Figure 8:
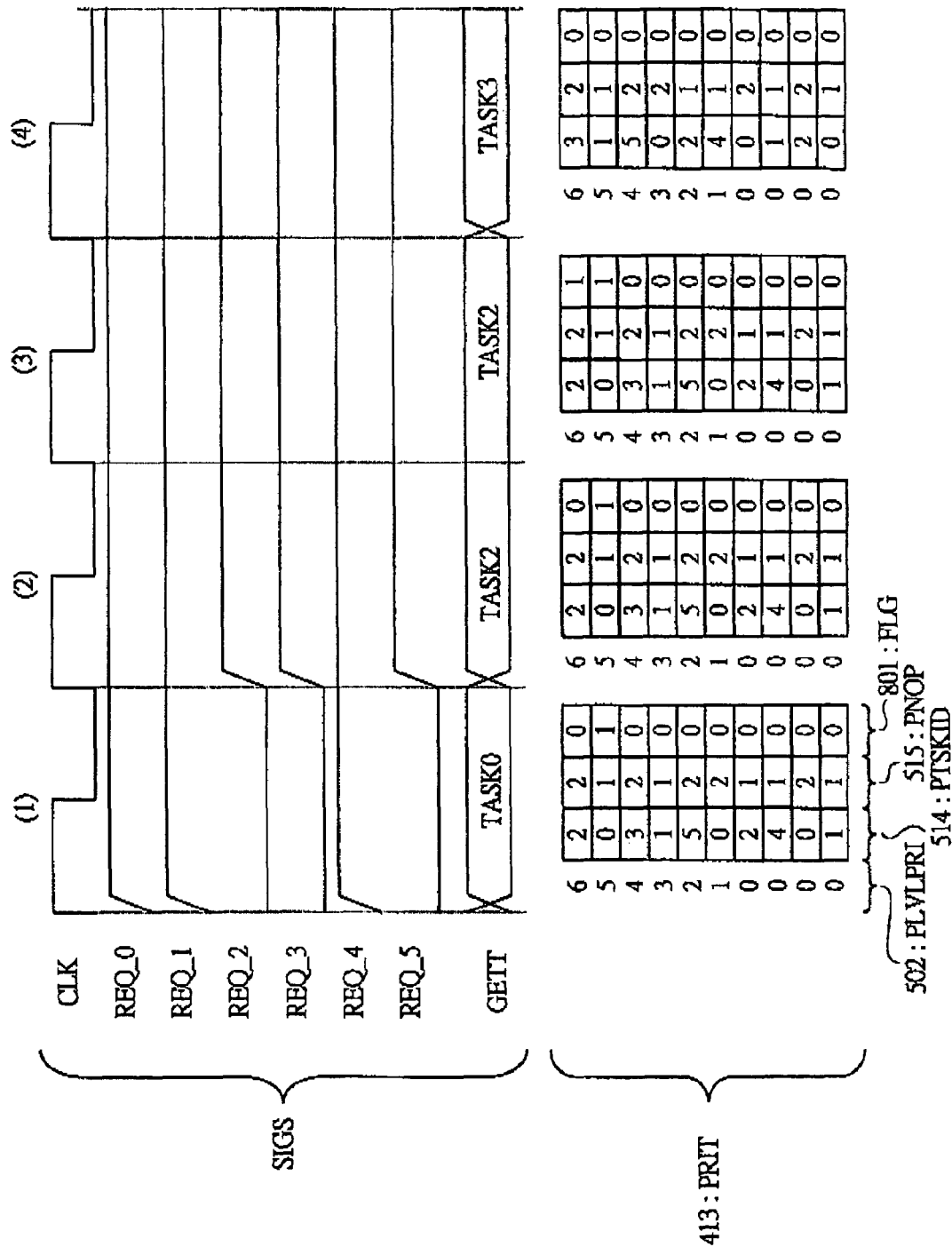
FIG. 8 is a diagram showing another operation of the first embodiment of the target resource use request arbiter (ARB) in the information processing device according to the present invention.

In FIG. 8, another method of controlling the priority table will be shown. A characteristic of this method is that the order in the priority table is not changed until the task request having the highest priority is processed. Furthermore, flag bits (FLG) 801 are provided in PRIT 413.

In FIG. 8, at the time when the clock cycle (1) is completed, although the process of task 0 having a priority of 5 is completed, the order is not changed. The order is collectively changed at the end of the clock cycle (3) in which the process of the task 2 having the highest priority is completed. Therefore, the flag bits (FLG) 801 for storing whether the processes of the corresponding tasks are completed or not are provided in the priority table. When the process is completed, 1 is set in the corresponding FLG 801, and at the time when the task having the highest priority is completed, the priorities of the blocks in which 1 is set in FLG 801 continuously from the highest level (in the clock cycle (3) of FIG. 8, the blocks having 6 and 5 in PLVLPRI 502) are changed to the lowest priorities, and the values in the table which are corresponding to the changed blocks are cleared (initialization in the clock cycle (4)). Another characteristic of this method is that the target resource use pattern which has been specified at the beginning is maintained, and initialization is not required.

Second Embodiment of Target Resource Use Request Arbiter

In order to reliably compensate the real-time ability with a further smaller circuit scale in comparison with the first embodiment, the master circuits 401 to 403 output urgency notification signals (PRI signals in FIG. 4) of the processing requests for the respective tasks, and the target resource use request arbiter ARB 106 arbitrates the requests by means of the combination of both the urgency notification signals PRI and the above-described method.

Figure 9:
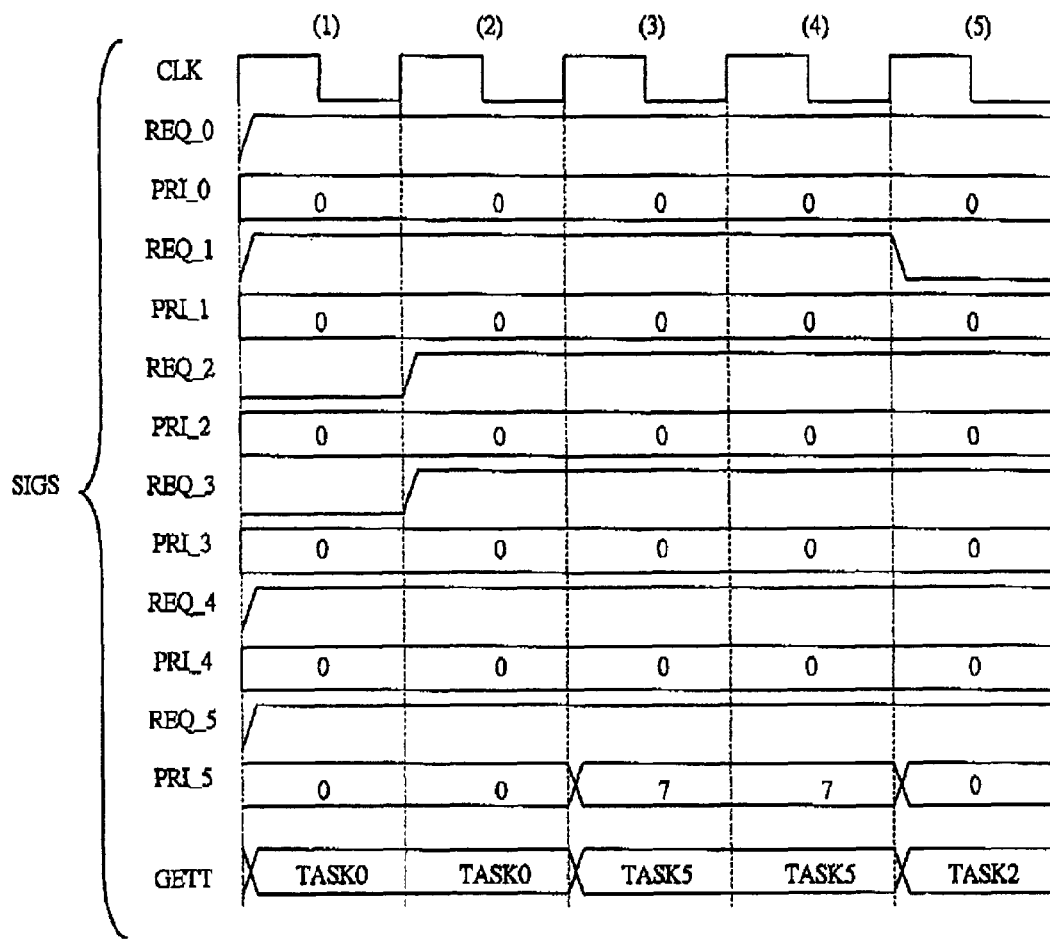
FIG. 9 is a diagram showing an operation of a second embodiment of the target resource use request arbiter (ARB) in the information processing device according to the present invention.

FIG. 9 shows a specific operation of the target resource use request arbiter ARB 106 according to the second embodiment. In FIG. 9, similar to FIG. 7, the upper part SIGS represents signal operations in respective cycles. CLK is clocks, REQ_0, 1, 2, 3, 4, and 5 are target resource use requests from the tasks 0, 1, 2, 3, 4, and 5, respectively, PRI_0, 1, 2, 3, 4, and 5 are urgency notification signals to ARB 106 respectively from the tasks 0, 1, 2, 3, 4, and 5, and GETT represents the tasks which have obtained the right to use the target resource in respective clock cycles.

The urgency notification signals PRI are normally 0, and the tasks determine the urgency of the processes and manipulate the urgency. Normally, the value is determined by the relation between the remaining amount and the permissible time of the process.

In some cases, a plurality of the circuit modules use the priority signals, and the values of the urgency from the master circuits are determined in the whole system such that the required resource amounts are allocated to the master circuits. Since the value of urgency is different in each LSI, each master circuit can be configured such that the urgency can be set by a storage device in the master circuit or a signal from outside the master circuit.

In the clock cycle (3) of FIG. 9, urgency 7 is appended to the request from the task 5. This is the value higher than any other priorities of all the tasks in the priority table, and the right to use the target resource is given to the task 5. The operation in the clock cycle (4) is performed also in the same manner. Concurrently with the completion of this cycle, the priority of the task 5, which is specified in the fourth row of the priority table, drops to the lowest level, and the tasks of the fifth and the following rows are sequentially raised. In the method in which the priority table is manipulated even when the target resource is used by means of such urgency notification signals FRI, the proportion specified in TSKPRIR 409 can be readily maintained.

Figure 10:
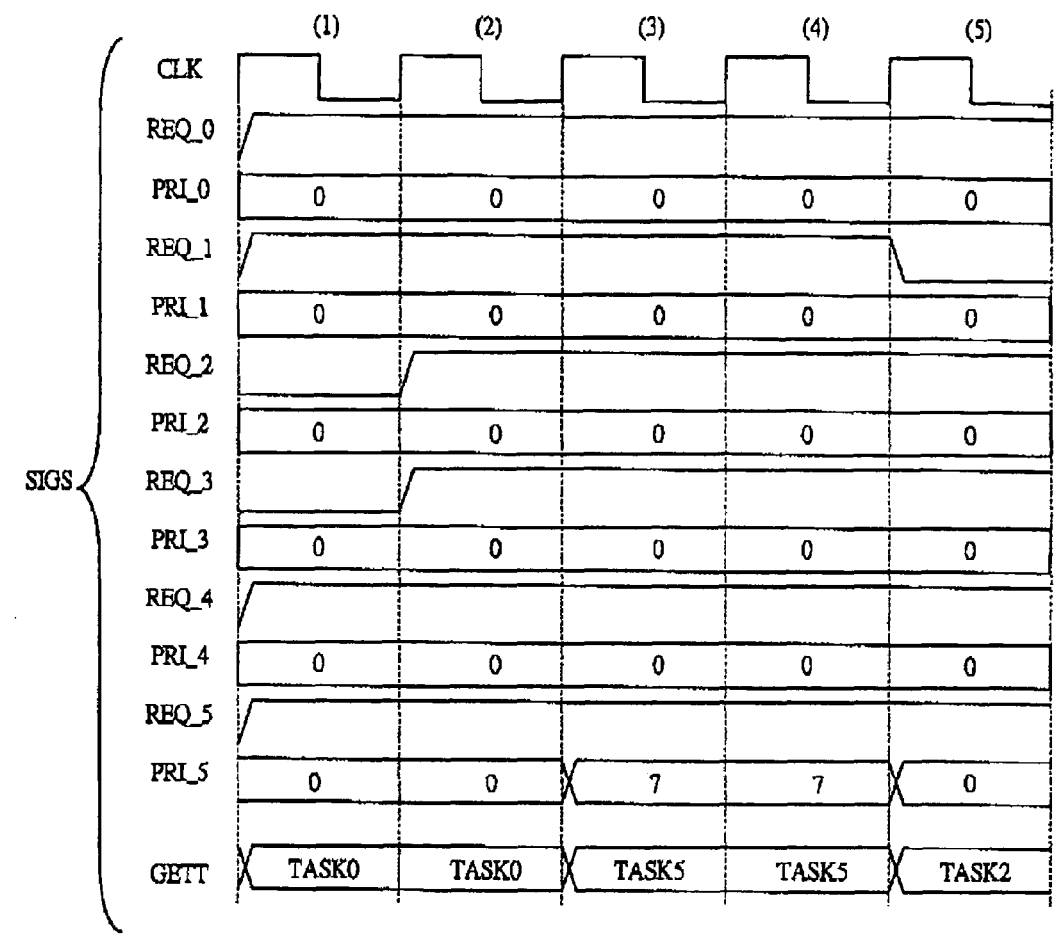
FIG. 10 is a diagram showing another operation of the second embodiment of the target resource use request arbiter (ARB) in the information processing device according to the present invention.
Figure 10:
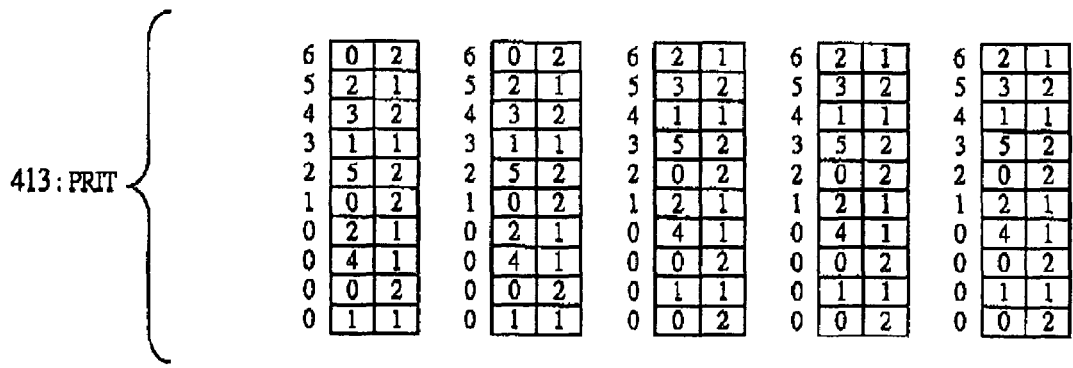

Also, if the case where the target resource is used by means of the urgency notification signals PRI is considered as a special case, the method in which the values in the priority table are not manipulated (FIG. 10) is also available.

Figure 11:
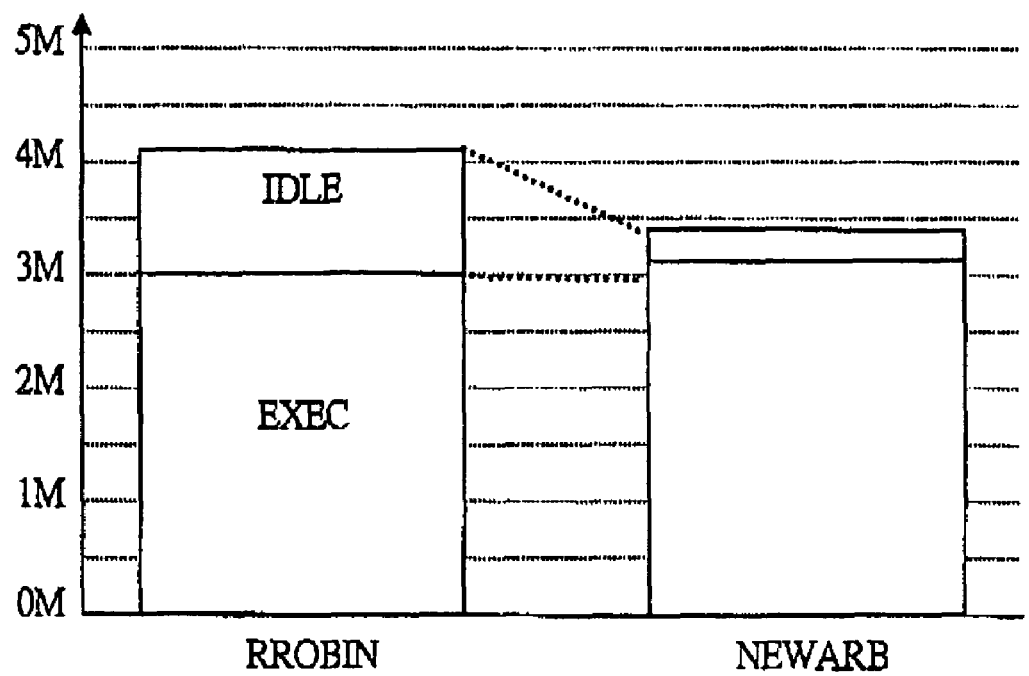
FIG. 11 is a diagram showing effects of the second embodiment of the target resource use request arbiter (ARB) in the information processing device according to the present invention.

FIG. 11 shows an example in which performance is improved by use of the method shown in the second embodiment. This example shows the results of application execution in which import of camera images, MPEG encoding, image blending, and sound processing are executed in parallel, that is, the number of cycles CYC_FRM required for processing a critical VIDEO frame is shown. In this example, since all the tasks have memory access, optimizing the conflict of memory accesses leads to performance improvement. The target resource is a memory.

The left side bar RROBIN of the graph is the result before applying the present invention, in which target resource use arbitration by means of the most common round-robin method is performed. On the other hand, the right side of the graph, that is, NEWARB is the result when the second embodiment is employed. As a result of applying the present invention, wasted cycles IDLE of the target resource can be reduced, and the performance improvement can be achieved. Note that the part EXEC in the graph represents the number of cycles where the target resource is effectively utilized.

Therefore, according to the first, second, and third embodiments of the information processing device and the first and second embodiments of the target resource use request arbiter, the resource usage amount required for each task when real-time applications are executed can be compensated. The characteristic thereof is to satisfy the conditions of (1) tolerance against variation in the timing of target resource use requests from the masters is provided, (2) optimization according to the usage manner of the user can be performed, and (3) the operating frequency, the circuit scale, and the like are not largely affected.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be applied to, for example, a system LSI including circuit modules such as CPUs, accelerators for particular processes, and various memory controllers.

What is claimed is:
1. An information processing device comprising:
   first and second bus master circuits;
   a bus to which said first and second bus master circuits are connected; and
   a first arbiter for arbitrating access rights of said first and second bus master circuits to said bus,
   wherein said first arbiter has a storage unit for retaining information representing priorities of said access rights of said first and second bus master circuits and a control unit for arbitrating the access rights of said first and second bus master circuits based on the information of said storage unit, and said storage unit has a first storage unit portion in which information representing the priorities of said first and second bus master circuits is set at a time of initial setting of said information processing device, and a second storage unit portion in which information representing the priorities is changed in accordance with an operation of said information processing device,
   when a priority of said first bus master circuit is higher than a priority of said second bus master circuit and there is no access request from said first bus master circuit but there is an access request from said second bus master circuit, said control unit permits bus access of said second bus master circuit and said storage unit lowers the priority of said second bus master circuit without changing the priority of said first bus master circuit, and
   when a predetermined period elapses after said information processing device is in an operational state, said second storage unit portion changes said information representing the priorities in accordance with the information stored in said first storage unit portion.

2. The information processing device according to claim 1,
   wherein said storage unit retains information representing a priority for each task allocated to said first and second bus master circuits.

3. The information processing device according to claim 1,
   wherein said storage unit further retains permitted time period information which represents the number of clock cycles in which said first and second bus masters can continually access the bus after said first or second bus master circuit is initially permitted to access the bus, and said control unit controls said access rights in accordance with said permitted time period information.

4. The information processing device according to claim 1,
   wherein said second bus master circuit further includes a third bus master circuit, a fourth bus master circuit and a second arbiter, and said second arbiter arbitrates access requests from said third and fourth bus master circuits to said first arbiter.

5. The information processing device according to claim 1,
   wherein said second storage unit has a shift register having a plurality of registers,
   a fixed priority is allocated to each of said plurality of registers and each register stores information of one of the bus master circuits which is to be permitted access to the bus at the priority corresponding to that register, and
   said shift register transfers the information of a first register, which is permitted to access the bus by said control unit, to a second register to which a lowest priority is allocated, and transfers the information of the second register, to a third register having a higher priority than the second register.

6. An information processing device comprising:

first and second bus master circuits;

a bus to which said first and second bus master circuits are connected; and a first arbiter for arbitrating access rights of said first and second bus master circuits to said bus, wherein said first arbiter has a storage unit for retaining information representing priorities of said access rights of said first and second bus master circuits and a control unit for arbitrating the access rights of said first and second bus master circuits based on the information of said storage unit, said storage unit has flags retaining information representing whether access of said first or second bus master circuit is permitted or not, when the priority of said first bus master circuit is higher than the priority of said second bus master circuit and there is no access request from said first bus master circuit but there is an access request from said second bus master circuit, said control unit permits access of said second bus master circuit, and said storage unit stores, in one of said flags, information representing that access is permitted, and when access of said first bus master circuit is permitted, the priorities of said first bus master circuit and said second bus master circuit are lowered.

* * * * *